(12) United States Patent
He et al.

(10) Patent No.: US 7,543,754 B2
(45) Date of Patent: Jun. 9, 2009

(54) METHODS AND APPARATUS FOR INFORMATION CAPTURE ILLUMINATION

(75) Inventors: Duanfeng He, S. Setauket, NY (US); Eugene Joseph, Coram, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/855,285

(22) Filed: Sep. 14, 2007

(65) Prior Publication Data

US 2008/0000978 A1 Jan. 3, 2008

Related U.S. Application Data

(63) Continuation of application No. 11/027,733, filed on Dec. 30, 2004, now Pat. No. 7,281,662.

(51) Int. Cl.
*G06K 7/10* (2006.01)

(52) U.S. Cl. .............................. 235/462.42; 235/462.06
(58) Field of Classification Search ............ 235/462.06, 235/462.42, 462.4
See application file for complete search history.

(56) References Cited

U.S. PATENT DOCUMENTS

2005/0011956 A1* 1/2005 Carlson .................. 235/462.42

* cited by examiner

*Primary Examiner*—Karl D. Frech (57) ABSTRACT

Methods and apparatus for illuminating objects comprising asymmetrically illuminating an object using an illumination medium on one side of an optical module of an information capturing module, capturing an electronic representation of the object and decoding the electronic representation of said object. In alternate embodiments, the scanner successively illuminates the object from a plurality of different angles until the object and/or dataform is decoded. The illumination medium can be external to the information capturing module.

18 Claims, 6 Drawing Sheets

METHODS AND APPARATUS FOR INFORMATION CAPTURE ILLUMINATION

PRIORITY CLAIM

The present application is a Continuation application of U.S. patent application Ser. No. 11/027,733 filed on Dec. 30, 2004 now U.S. Pat. No. 7,281,662 entitled "Methods and Apparatus for Information Capture Illumination". The entire disclosure of this application is expressly incorporated herein by reference.

FIELD OF THE INVENTION

The invention is directed to methods and apparatus for capturing data and, more particularly to illuminating Direct Part Mark (DPM) dataforms.

BACKGROUND OF THE INVENTION

There are numerous standards for encoding numeric and other information in visual form, such as the Universal Product Codes (UPC) and/or European Article Numbers (EAN). These numeric codes allow businesses to identify products and manufactures, maintain vast inventories, and manage a wide variety of objects under a similar system and many other functions. The UPC and/or EAN of the product is printed, labeled, etched, or otherwise attached to the product as a dataform.

Dataforms are any indicia that encode numeric and other information in visual form. For example, dataforms can be barcodes, two dimensional codes, marks on the object, labels, signatures, signs etc. Barcodes are comprised of a series of light and dark rectangular areas of different widths. The light and dark areas can be arranged to represent the numbers of a UPC. Additionally, dataforms are not limited to identifying products. They can be used to identify important objects, places, etc.

Direct Part Marking (DPM) is an important way to permanently mark objects for identification. For example, the automotive and aerospace industries have decided to use DPM dataforms to identify their products. In DPM, the surface of the object is modified to include dataforms, such as, for example, barcodes, two dimensional codes, etc. One exemplary method of marking is dot-peening, in which the surface of the object is impacted by a peening device, such as, for example, a stylus. Each impact creates a "crater", and a collection of craters can be used to form patterns that represent dataforms such as a DataMatrix™. The crater may also have a slightly raised rim around its circumference created by the material displaced during the peening process. Other methods to create surface profile modifications comprise laser etching, chemical etching, and electrochemical etching.

Figure 1:
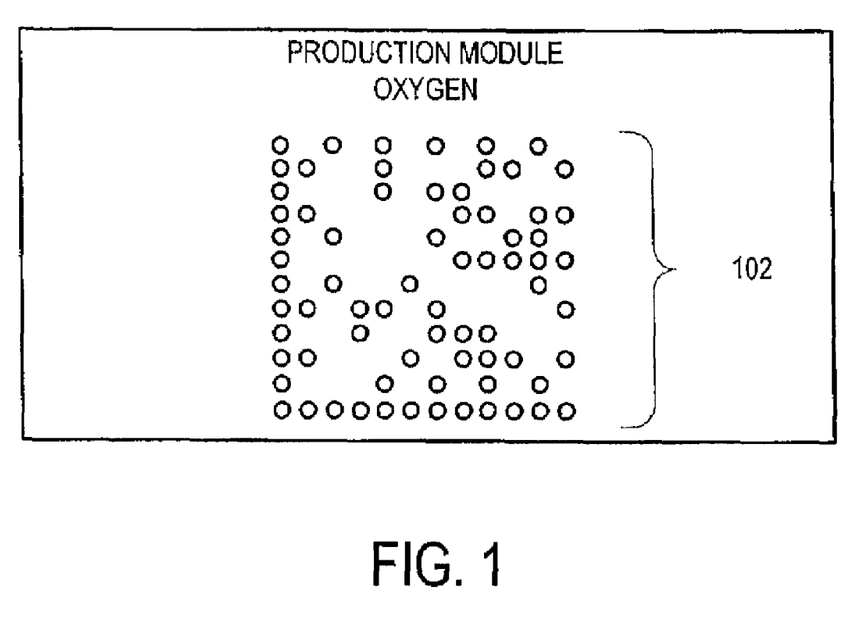
FIG. 1 illustrates an exemplary DPM dataform.

FIG. 1 illustrates an exemplary dot-peened dataform 102. The circles represent craters on the surface of the object. The craters are arranged in an array that represents information. The dataform 102 can comprise information regarding the manufacturer, the UPC, the time, date and location of manufacture, etc. This information can be used for inventory, accountability, identification, recalls, etc.

In some DPM applications there is no intrinsic contrast at the site of the marking between the surface of the object and the dataform, when scanning DPM dataforms, scanning devices use the creation of highlights and/or shadows on the surface of the object to properly detect the dataform. Two ways to detect the dataform are to use bright field illumination and dark field illumination.

In an exemplary bright field illumination implementation, an extended light source is used to create a broad beam illumination. When an image of the dataform is captured using bright field illumination, the background surface tends to show up bright, while the marked features, i.e., the dataform, shows up dark. In one exemplary dark field illumination implementation, a narrow beam illumination is created by a set of point light sources rather than a single point light source. When using dark field illumination, the dataform is lit up brightly, while the surface of the object is left in relative darkness.

Known scanners that use this dark field illumination method implement point light sources that are symmetrical about the optical system of their camera. For example, one known scanner has a ring of 9 light emitting diodes (LEDs) that illuminate the dataform at the same time, while other scanners have a diffusing lightpipe that has a cylindrical extrusion that is designed to enclose the mark being scanned.

Other handheld scanners comprise two light sources that illuminate a dataform from the left and right sides simultaneously, while a proposed print-quality standard of DPM suggests the use of four point light sources 90° from each other and at 45° from the surface of the dataform, with the camera of the scanner situated at a perpendicular direction that passes through the center, or in other words, along an axis that is symmetrical with respect to the four light sources. Unfortunately, symmetric illumination of DPM dataforms can make the image difficult to decode when the dataform is illuminated at certain angles.

In another dark field illumination implementation, glancing illumination is used to brightly illuminate the dataform. Glancing illumination is illumination that strikes the dataform at an extreme angle. Light that strikes the surface of the object glances off, while light that strikes the craters of the dataform is reflected back to the scanner. A known handheld DPM scanner that provides glancing illumination comprises a clear cylindrical pipe. A first open end of the pipe is attached to the head of the scanner and a second end of the pipe contains LEDs. The LEDs provide a broad illumination and are broken into four equal groups. All the LEDs may be used at once or one group at a time may be used. In an exemplary operation of the scanner, a user places the second end of the pipe directly over a dataform to provide glancing illumination. Unfortunately, in order to make sure the illumination is glancing the user must place the pipe directly on or very close to the surface of the object. In addition, the field of view of the camera does not extend far beyond the second end of the pipe. Thus, the glancing scanner is not effective when a target dataform is surrounded by an obstruction, or if the dataform is recessed in a sunken area of an object since the illumination is no longer glancing and the field of view of the scanner may not extend that far.

Additionally, known DPM scanners with built in illumination subsystems, such as the ones described above, are often large and/or fragile. Accordingly, a need exists for DPM scanners with sturdy illumination subsystems that do not have to be placed directly over a target dataform and can produce images that are easier to decode.

SUMMARY OF THE INVENTION

The invention as described and claimed herein satisfies this and other needs, which will be apparent from the teachings herein. An embodiment of the invention includes methods and apparatus for asymmetrically illuminating DPM dataforms.

An exemplary embodiment of the invention comprises a method of asymmetrical illumination for data capture, where, for example, a DPM scanning device illuminates a dataform using an illumination medium on one side of an optical module of the scanning device. Simultaneous with the illumination the scanning device captures an electronic representation of the dataform and decodes the dataform.

In an alternate embodiment of the invention, the DPM scanning device comprises a plurality of light sources located around the optical module of the scanner. These light sources may or may not be symmetrical with respect to the optical module. The scanner illuminates the DPM dataform using each of, or subsets of, the light sources in turn and optionally stops when it successfully reads the dataform. The multiple light sources allow the scanner to illuminate dataforms asymmetrically and at different angles.

In some embodiments, the illumination medium rotates about an axis, and the scanner illuminates the dataform at different rotational angles. The scanner captures and attempts to decode an electronic representation of the dataform at each angle and optionally stops after a successful decode.

In an alternate embodiment, the illumination medium is located externally from the data capture module, and is directed at the dataform. The illumination can be a point light source and/or be directed asymmetrically at the dataform. An external illumination medium can be used, for example, in a manufacturing assembly line environment.

Other objects and features of the invention will become apparent from the following detailed description, considering in conjunction with the accompanying drawing figures. It is understood however, that the drawings are designed solely for the purpose of illustration and not as a definition of the limits of the invention.

BRIEF DESCRIPTION OF THE DRAWING FIGURES

The drawing figures are not to scale, are merely illustrative, and like reference numerals depict like elements throughout the several views.

DETAILED DESCRIPTION OF EXEMPLARY EMBODIMENTS

There will now be shown and described in connection with the attached drawing figures several exemplary embodiments of methods and apparatus for asymmetrical illumination.

An exemplary data capture device, such as, for example, a DPM image scanner, implemented in accordance with the invention comprises an illumination module, for example an LED, positioned on one side of a scan module, for example, the camera, of the scanner. The position of the LED relative to the camera creates asymmetrical narrow-beam illumination for scanning DPM surfaces.

In an additional embodiment of the invention, the angular tolerance of the scanner can be broadened by adding multiple lights or groups of lights around the camera. The placement of the lights may or may not be symmetrical with respect to the camera. During a decoding operation of an asymmetrical illumination scan method, each light or group of lights illuminates the dataform in turn. The scanner captures and decodes images of the dataform from each illumination angle, and can cease operation when a successful decode is made. In an alternate embodiment the angular tolerance can be increased using a rotating or pivoting illumination module.

When multiple illumination sources are used from multiple sides of a scanner's camera, it is hoped that the center of the crater is left in shadow, while the circumference of the crater is illuminated so that the crater appears as a single highlighted entity in an image. Unfortunately, when the illumination is not exactly a circle, multiple highlights and shadows created by the crater and the rim of the crater can create images that are difficult to decode. For example, when light is cast on an impact site from multiple angles, multiple highlights can be seen reflecting off of the curves surface of the crater. In addition, multiple shadows can be seen created by the rim of the crater. These additional highlights and shadows can complicate the interpretation of images.

When a dataform is scanned, the angle of the object with respect to the light source and the camera is dynamic since the object is either moving in front of the scanner or the scanner is being moved in front of the object. A DPM scanner typically takes multiple images during one decoding attempt since the angle of the object may be changing and the image captured at certain illumination angles may be easier to decode. When multiple symmetrical light sources are used to simultaneously illuminate a dataform, it can be difficult to frame the dataform to obtain one highlight and/or shadow per impact site, because there are numerous illumination angles where the multiple simultaneous light sources create multiple highlights and shadows in the captured image.

Even under asymmetrical illumination, at certain angles, the crater and rim of each impact site may create two sets of highlights and shadows, but the image is limited to those two sets. If illuminated symmetrically, the image can include additional highlights and shadows that make interpretation even more difficult. Thus, asymmetrically illuminating the DPM dataform increases the chances of capturing an image that shows one highlight and/or shadow per impact site, making the image easier to decode.

In some environments, such as, for example a manufacturing assembly line, data capture can be accomplished using a system comprising a data capture module and an external illumination medium. A DPM scanner's performance can be improved with the correct illumination, such as on-axis, off axis, asymmetrical, point or diffuse illumination, and the correct illumination can vary under different conditions and/or configurations. If a object's orientation is relatively constant with respect to the data capture module and the external illumination medium, such as, for example, objects on an assembly line, the external illumination medium best suited for the particular set of conditions can be chosen to be directed at the passing objects so that it correctly illuminates dataforms.

Figure 2:
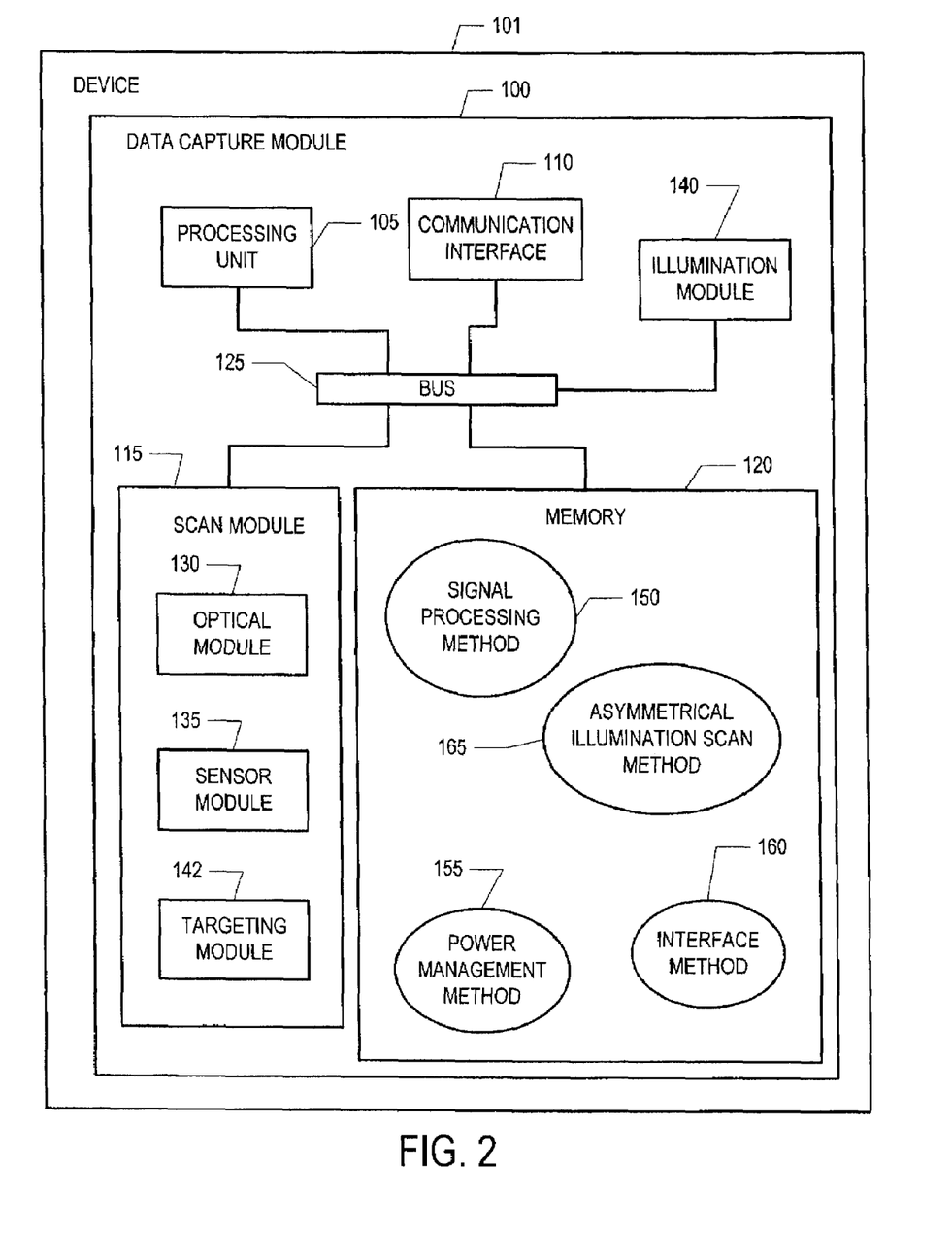
FIG. 2 illustrates an exemplary data capture module implemented according to an embodiment of the invention.

With reference to FIG. 2, there is shown an exemplary block diagram of a device 101 comprising a data capture module 100. The device 101 can be, in an exemplary embodiment, a hands-free scanner, a handheld scanner, a mobile computer, etc. The data collection module 100 can be, in one non-limiting exemplary embodiment, an image scanner module 100. The image scanner 100 can be integrated into the device 101. In addition, although the data capture module 100 is illustrated as being within device 101, in alternate embodiments, the data capture module 100 can be a separate module that is coupled to the device 101, by a wire or wirelessly. For example, in one embodiment, the data capture module 100 can be a convertible handheld/stationary scan gun coupled to a computer 101.

Image scanner 100 comprises processing unit 105, scan module 115, memory 120, communication interface 110 and illumination module 140 coupled together by bus 125. The modules of data capture module 100 can be implemented as any combination of software, hardware, hardware emulating software, and reprogrammable hardware. The bus 125 is an exemplary bus showing the interoperability of the different modules of the invention. As a matter of design choice there may be more than one bus and in some embodiments certain modules may be directly coupled instead of coupled to a bus 125.

Processing unit 105 can be implemented as, in exemplary embodiments, one or more Central Processing Units (CPU), Field-Programmable Gate Arrays (FPGA), etc. In an embodiment, the processing unit 105 can comprise a general purpose CPU that processes software and raw image data stored in memory 120. In other embodiments, modules of the processing unit 105 may be preprogrammed in the processing unit's 105 memory to perform functions, such as, for example, signal processing, interface emulation, etc. In alternate embodiments, one or more modules of processing unit 105 can be implemented as an FPGA that can be loaded with different processes, for example, from memory 120, and perform a plurality of functions. Processing unit 105 can comprise any combination of the processors described above.

Scan module 115 can be implemented as, in one exemplary embodiment, a camera 115 comprising an optical module 130, a sensor module 135 and a targeting module 142. The optical module 130 can be, for example, the lens 130 of the camera 115. In some embodiments, the optical module 130 can comprise of more than one lens and/or provide more than one focus point. In addition, the optical module 130 is not limited to lenses; any prism and/or other optical medium that is suitable for capturing images can be used to implement the optical module 130.

The sensor module 135 can be implemented, in one exemplary embodiment, as a Charged-Coupled Device (CCD). The CCD 135 records images in digital format for processing. In alternate embodiments, any sensor that captures images can be used to implement the sensor module 135, such as, for example, CMOS semiconductors. The illumination module 140, may be implemented, in one non-limiting exemplary embodiment, as one or more Light Emitting Diodes (LED) 145. Other illumination mediums may be used in alternate embodiments. The placement, number and use of the illumination medium 140 to provide asymmetric illumination are further described below.

Some embodiments of the invention may comprise a targeting module 142. The targeting module 142 comprises a light source or sources, for example, a laser, that projects a target approximating the field of view of the image scanner 100. The target appears on an object as a crosshair, a square, a circle, or any other design that can assist the user in placing the dataform in the field of view of the scanner.

Memory 120 can be implemented as volatile memory, non-volatile memory and rewriteable memory, such as, for example, Random Access Memory (RAM), Read Only Memory (ROM) and/or flash memory. The memory 120 stores methods and processes used to operate the image scanner 100, such as, signal processing method 150, power management method 155, interface method 160 and asymmetrical illumination scan method 165. The memory 120 can also be used to store raw image data and/or processed image data.

When a decoding operation is initiated, for example a trigger is depressed, the scanner 100 begins asymmetrical illumination scan method 165. In an embodiment of the invention, the scanner illuminates the target dataform from one side of the scan module 115. Scan module 115 capture images within the field of view of the scanner 100, and the images are analyzed and decoded by signal processing method 150.

Figure 3:
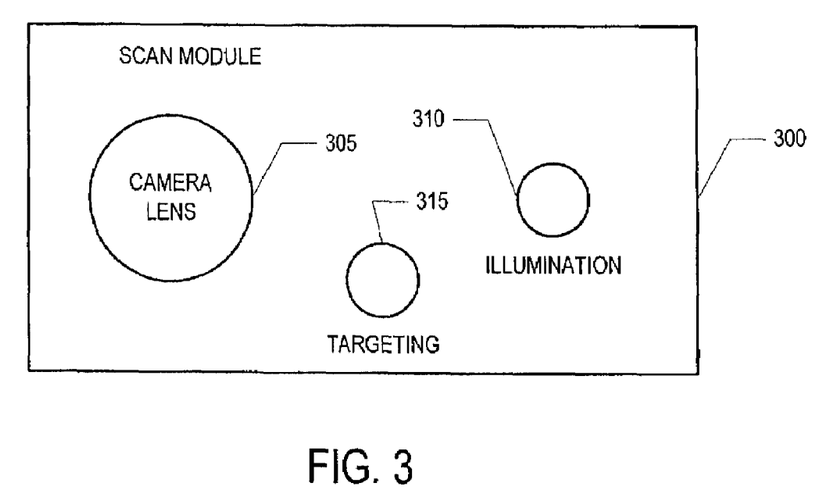
FIG. 3 illustrates an exemplary scan module implemented according to an embodiment of the invention.

FIG. 3 illustrates the front view of an exemplary scan module 300, implemented in accordance with an embodiment of the invention. Scan module 300 comprises a camera lens 305, an illumination medium 310 and a targeting lens 315. The illumination medium 310, for example LED 310, is located on the left side of the camera lens 305. Since the light from the LED 310 is coming from one side of the camera lens 305, LED 310 asymmetrically illuminates dataforms, during a decoding operation. In alternate embodiments, illumination module 310 may comprise a group of LEDs located on the same side of the camera lens 305. In an exemplary embodiment, the LED 310 is positioned to illuminate a target dataform at an angle when the lens 305 is lined up with the dataform. The light from the LED 310 illuminates the dataform at an angle, but the illumination medium and/or scanner does not have to be touching or extremely close to the dataform.

In another embodiment, in order to increase the angular tolerance of the scanner 100, the scan module 100 may comprise additional LEDs 140 located on different sides of the camera lens 130. Since the orientation of the object and the scanner are dynamic, the highlights and/or shadows created by the dataform may be easier to decode from one illumination angle over another. The dispersed LEDs, used in turn, allow the scanner 100 to asymmetrically illuminate the dataform from different angles. One or more images of the dataform are captured for each illumination angle, and once the dataform is successfully decoded the scanner 100 can optionally end the decoding operation.

Figure 4:
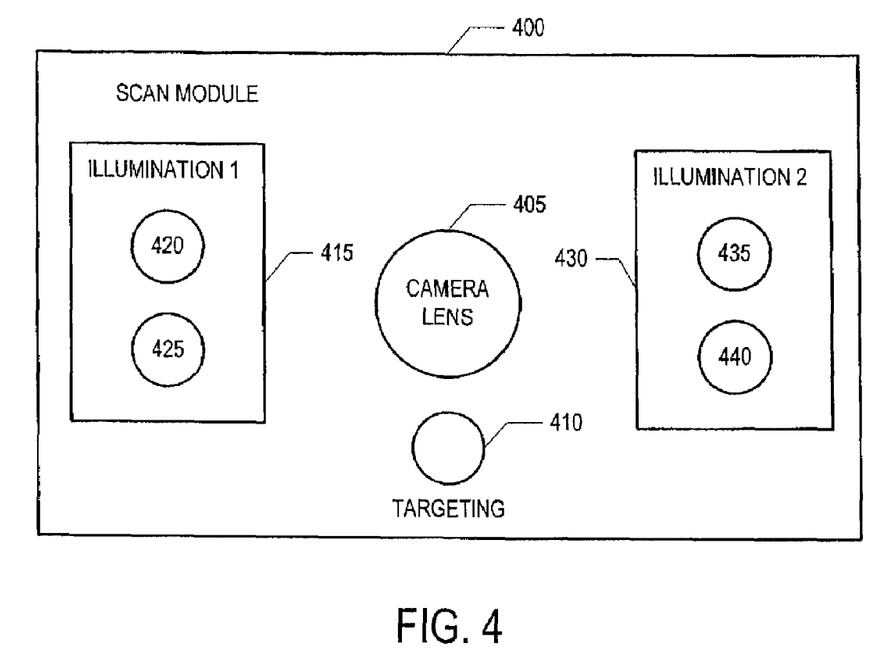
FIG. 4 illustrates another scan module implemented according to another embodiment of the invention.

FIG. 4 illustrates the front view of another exemplary scan module 400, implemented in accordance with the invention. Scan modules 300 and 400 are illustrative and are not drawn to scale. Scan module 400 comprises a camera lens 405, a targeting lens 410, a first illumination medium 415, which comprises a group of LEDs 420, 425 and a second illumination medium 430, which comprises a second group of LEDs 435, 440.

In an exemplary decoding operation of an asymmetrical illumination scan method, the scan module 400 captures and analyzes one or more images of a target dataform using the first illumination medium 415. If the scanner 100 does not successfully decode the dataform using the captured images, the scan module 400 illuminates the dataform using the second illumination medium 430, and captures and analyzes additional images. A decoding operation performed using the second illumination angle may be successful because the dataform and/or scanner 100 may be positioned so that the second illumination angle produces images that are easier to decode.

The exemplary embodiment illustrated in FIG. 4 is not limited to two illumination mediums. A plurality of LEDs or groups of LEDs can be placed around the camera lens. In addition, the illumination mediums do not have to be located symmetrically with respect to the camera lens 405. They can be located at different distances from the camera lens 405 to vary the illumination angles.

In some embodiments, the angular tolerance of the scanner 100 can be increased by using a rotating or pivoting illumination medium 140. The scanner 100 takes one or more images of the dataform at each illumination angle and optionally stops decoding when the dataform is successfully read.

Returning to FIG. 2, the data collection module 100 can be implemented as a module for different devices 101 that communicate in a variety of languages. Therefore, data collection module 100 comprises an interface method 160 that translates the decoded dataform into the language of the device 101 that interfaces with the data collection module 100. Different interfaces include Universal Serial Bus (USB), scanner emulation, IBM keyboard wedge, Symbol Serial Interface (SSI), etc.

Power management method 155 manages the power used by scanner 100. In some embodiments, the scanner 100 can switch to a power save mode, when no activity is detected for a given amount of time. The power save mode can completely shut down the scanner 100 or alternatively, it can slow the image capture rate, or initiate other power saving techniques.

The exemplary embodiment of FIG. 2 illustrates signal processing method 150, asymmetrical illumination scan method 165, interface method 160 and power management method 155 as separate components, but these methods are not limited to this configuration. Each method described herein in whole or in part can be separate components or can interoperate and share operations. Additionally, although the methods are depicted in the memory 120, in alternate embodiments the methods can be incorporated permanently or dynamically in the memory of processing unit 105. In some embodiments, scan module 115 can be separate from the data capture module 100, and the data capture module 100 can be implemented using a general purpose computer and software.

Memory 120 is illustrated as a single module in FIG. 2, but in some embodiments image scanner 100 can comprise more than one memory module. For example, the methods described above can be stored in separate memory modules.

Figure 5:
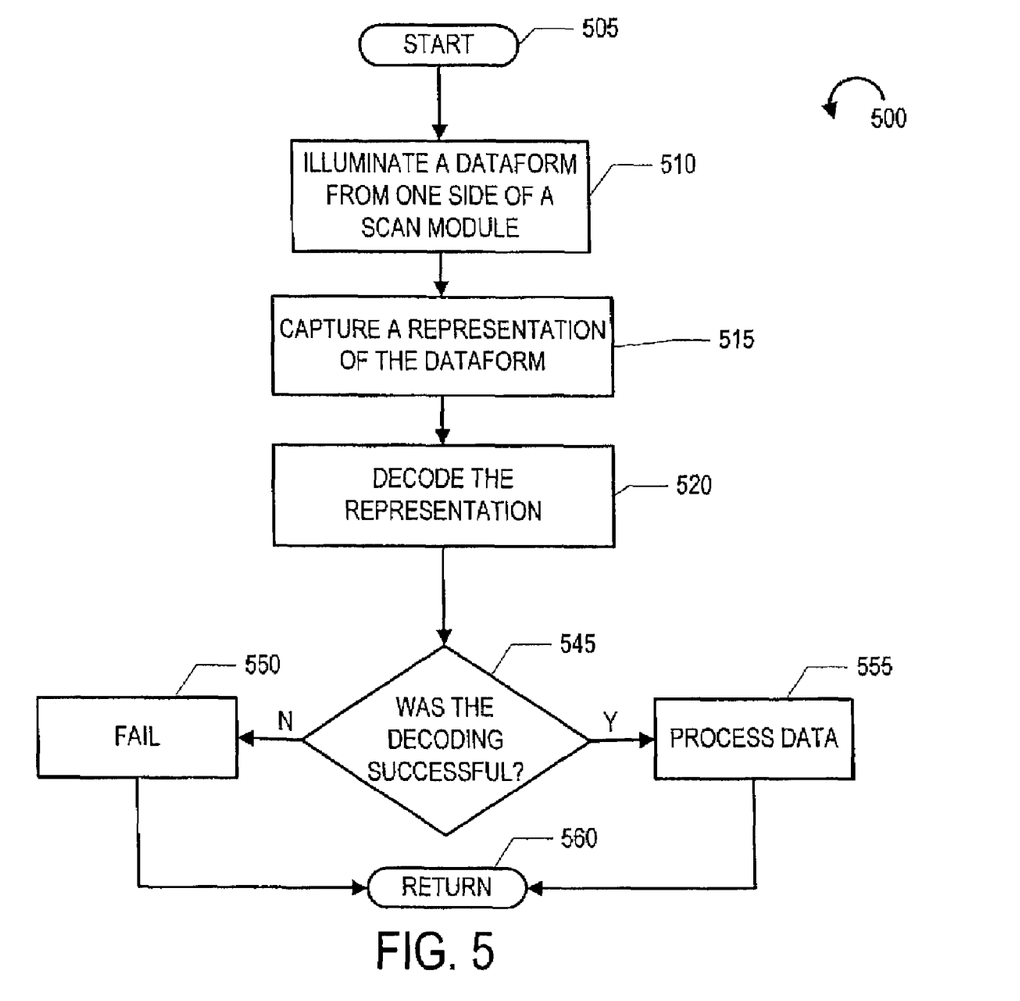
FIG. 5 illustrates an exemplary asymmetrical illumination method implemented according to an embodiment of the invention.

FIG. 5 illustrates an exemplary embodiment of a method 500 for scanning dataforms using asymmetrical illumination. Reference to image scanner 100 is made in the description of method 500. The steps of method 500 and other methods described herein are exemplary and the order of the steps may be rearranged as a matter of design choice. Asymmetrical illumination scan method 500 begins with start step 205. In an exemplary embodiment, the method 500 begins when the image scanner 100 and/or device 101 receives power and/or when a trigger or button on the scanner 100 is pressed. The device 101 and/or scanner 100 can run diagnostics prior to operation.

Processing proceeds from step 505 to step 510, where the scanner 100 illuminates a target dataform from on side of a scan module. The scan module 300 of FIG. 3 illustrates an exemplary configuration having an illumination medium 310 located on one side of the scan module 300. Illumination from one side of the scan module 300 asymmetrically illuminates the target dataform in accordance with the invention.

Processing proceeds from step 510 to step 515, where the scanner 100 captures a representation, for example a digital image, of the target dataform. Then, in step 520, the captured image is analyzed and the target dataform is decoded. In step 545, if the decoding algorithm is successful, processing proceeds to step 555, where the decoded data is further processed. For example, the data can be translated into a language that the device 101 can interpret. For example, if the image scanner 100 is attached to a computer via a USB connection, the decoded dataform is translated into a serial form, in step 555, and communicated to the device 101 through communication interface 110. Following step 555, processing of method 500 proceeds to step 560 where the method 500 returns to step 505, and the image scanner 100 is ready to process another dataform.

Returning to step 545, if the scanner 100 does not successfully decode the target dataform, processing proceeds to step 550. In some embodiments, the image scanner 100 does nothing, and returns in step 560 to step 505, but in other embodiments the scanner 100 can transmit a fail signal to the communication interface 110, and/or emit an audible fail indicator to the scanner 100 operator. The device 101 can be programmed to recognize the fail signal and alert the operator of the failure through an audible sound, and/or a message on a screen. Additionally, the scanner 100 and/or device 101 can instruct the operator to hold the dataform up to the scanner 100 and/or angle the scanner and/or object in different directions.

Returning to step 550, in alternate embodiments, in response to a failed decoding attempt, the scanner 100 returns, in step 560, to step 510 and takes another picture of the target dataform for analysis. The scanner 100 can try a predetermined number of times before failing. In other embodiments, two or more images may be analyzed in parallel.

Figure 6:
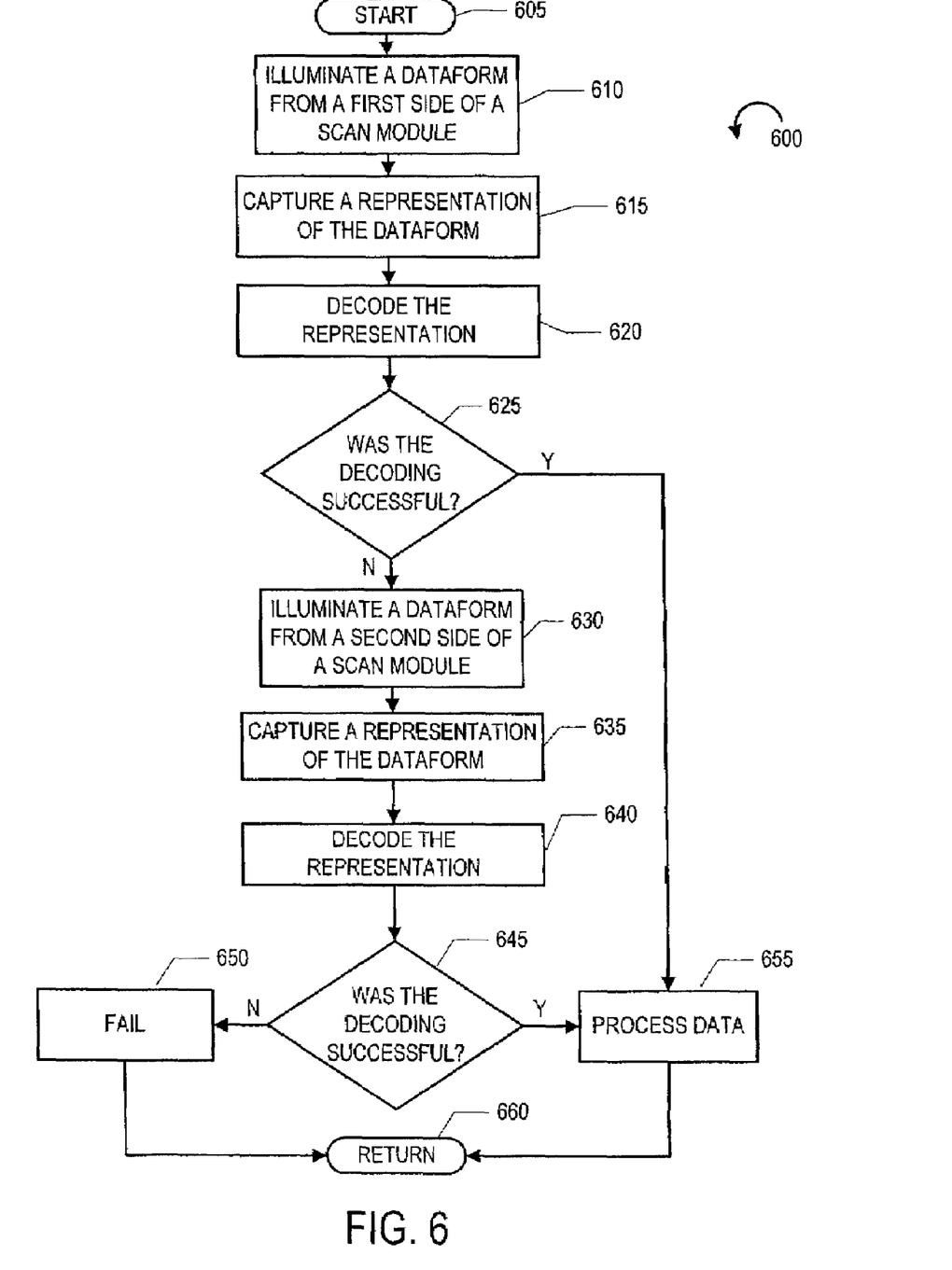
FIG. 6 illustrates an alternate symmetrical illumination method implemented according to an embodiment of the invention.

As illustrated in FIG. 4, the scanner 100 can comprise two or more illumination modules. FIG. 6 illustrate an exemplary embodiment of another asymmetrical illumination scan method 600, where the scanner 100 comprises a scan module with two illumination modules located to the left and right of a camera lens.

Asymmetrical illumination scan method 600 starts in step 605 where the scanner 100 is triggered into operation and/or receives power. In step 610, the scanner 100 illuminates the target dataform using a first illumination module, for example illumination module one 415. In alternate embodiments method 600 can start with illumination module two 430, or the scanner 100 can alternate between the illumination modules for every decoding operation.

Processing proceeds from step 610 to step 615, where the scanner captures a digital representation of the dataform, and in step 620 the image is decoded. If the decoding is successful, processing proceeds from step 625 to step 655, where the decoded data is further processed. Then, in step 660, the scanner 100 returns to start step 605, and is ready for another dataform.

Returning to step 625, if the decoding of the captured image is not successful, processing proceeds from step 625 to step 630, where the scanner 100 illuminates the target dataform from a second side, for example, illumination module two 430, of the scan module 400. In step 635, an image of the illuminated dataform is captured and in step 640 the image is decoded. In step 645, if the decoding is successful, processing proceeds from step 645 to step 655, where the decoded data is further processed. Then, in step 660, the scanner 100 returns to start step 605, and is ready for another dataform.

Returning to step 645, if the captured image is not successfully decoded, processing proceeds to fail step 650. Following step 650, in some embodiments method 600 returns, in step 660, to step 610 and attempts to decode the dataform again. This loop can be repeated for a predetermined number of iterations or until the scanner successfully decodes the dataform. In other embodiments, the scanner 100 returns, in step 660 to start step 605.

In other embodiments of method 600, the scanner 100 can capture images and attempt to decode the target dataform using the same illumination module for a predetermined number of times before switching to another illumination module.

A similar method as the one described in method 600 can be used in an embodiment where the scanner 100 increases angular tolerance using a rotating illumination module. Instead of capturing images using different illumination sources, multiple illumination angles are created by rotating the illumination medium.

Figure 7:
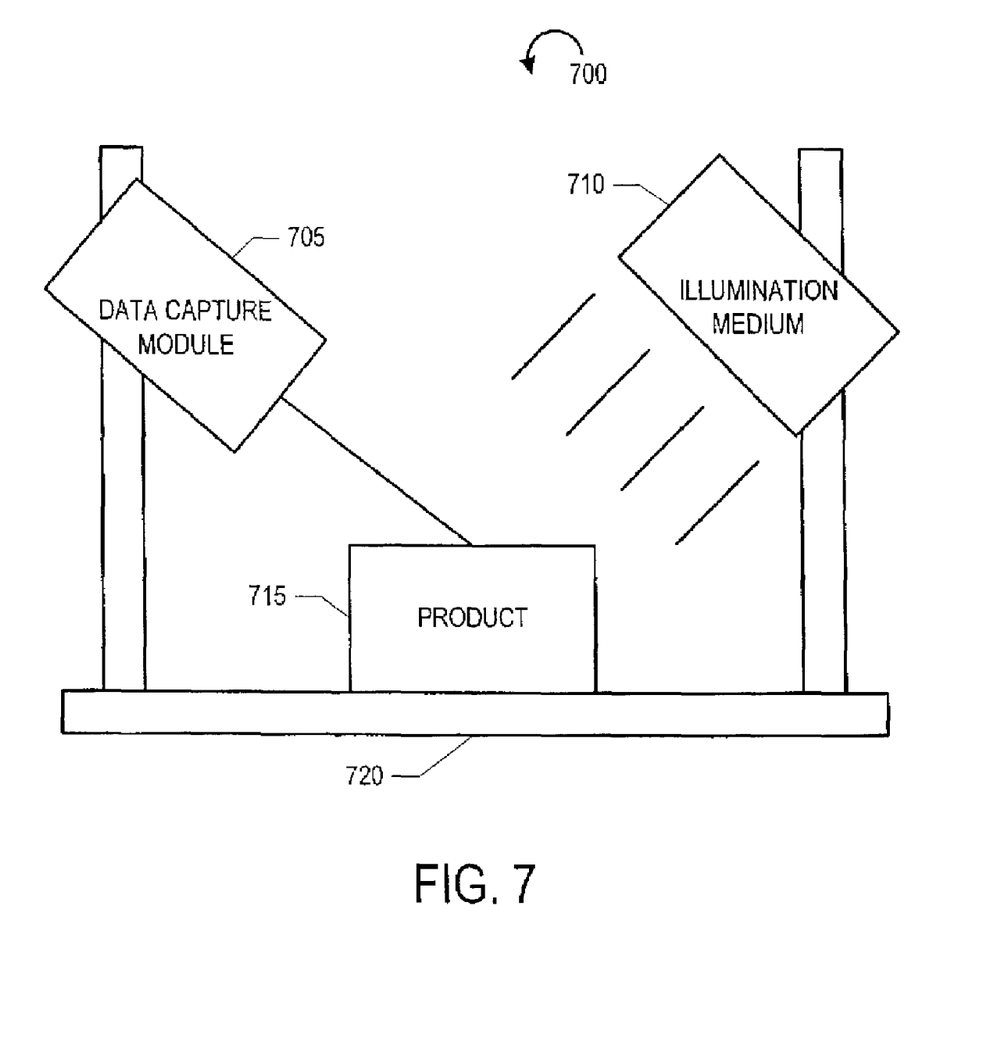
FIG. 7 illustrates an alternate embodiment of the invention comprising an external illumination medium.

FIG. 7 illustrates an alternate embodiment of the invention comprising a data capture system 700 with an external illumination medium. Data capture system 700 comprises a data capture module 705 and an illumination medium 710 directed at a object 715. The object 715 comprises a DPM dataform, for example, a two dimensional code. In one exemplary embodiment, the data capture system 700 is coupled to a structure 720 that is part of an assembly line. Objects are illuminated by illumination medium 710 as they pass the field of view of the data capture module 705. The data capture module 705 captures and analyzes the dataforms on the passing objects 715. In alternate embodiments, the data capture system 700 may comprise a structure 720 comprising a base or a platform, where objects can be placed for analysis.

In one embodiment, the data capture module 705 is implemented using a DPM scanner 705 without an illumination medium. Dataforms are illuminated by external illumination medium 710. The external illumination medium 710 can be implemented as a continuous mode fluorescent light-box, a flash illumination light box powered by LEDs, flash lamps, etc. The external illumination is chosen and positioned, manually and/or automatically to optimally illuminate DPM dataforms that pass the field of view of the scanner 705. For example, the illumination medium chosen can be point or diffuse illumination and the illumination medium 710 can be positioned asymmetrically, on-axis, off-axis, etc. Additionally, in alternate embodiments, the data capture system 700 can comprise multiple illumination mediums and perform the asymmetrical illumination scan method as described in FIG. 6.

In some embodiments, in order to facilitate synchronous illumination, the scanner 705 is coupled to the illumination medium 710, either by wire, wirelessly, through another computer, etc. The scanner 705 can transmit a control signal that turns on the external illumination medium 710 when the scanner 705 takes an image. The scanner's 705 exposure setting can be slightly longer than the illumination control signal, so that a delay in the illumination control signal does not cause the illumination medium 710 to be activated outside an exposure period. Turning the illumination medium on and off creates a flashing effect that freezes dataforms on moving objects.

Commonly available sensors, be it CCD or CMOS sensors, often are designed to operate optimally at 25-30 frames per second, according to the prevailing television signal standards around the world. Flash illuminations repeated at these rates tend to exhibit the effect of flicker. But for an environment like that of a constantly moving assembly line, repeated scanning at the maximum allowed rate is sometimes desirable. A method to suppress the flicker effect is to cause the illumination module to produce more flashes than that required by the number of image captures by the data capture module.

While the embodiments of the invention were described for decoding dot-peened dataforms, the present invention can be used with dataforms created by other DPM techniques such as etching.

While there have been shown and described and pointed out fundamental novel features of the invention as applied to preferred embodiments thereof, it will be understood that various omissions and substitutions and changes in the form and detail of the disclosed invention may be made by those skilled in the art without departing from the spirit of the invention, It is the intention, therefore, to be limited only as indicated by the scope of the claims appended hereto.

What is claimed:

1. A method for illumination, comprising:
coupling first and second illumination mediums to an information capturing module, wherein the first and second illumination mediums are activated in response to a control signal transmitted by the information capturing module;
illuminating an object using the first illumination medium located externally from the information capturing module;
capturing a first electronic representation of the object;
illuminating the object using the second illumination medium located externally from the information capturing module, an illumination from the first illumination medium being at substantially the same wavelength as an illumination from said second illumination medium;
capturing a second electronic representation of the object; and
analyzing the first and second captured electronic representations of the object.

2. The method of claim 1, wherein the illumination mediums are directed asymmetrically at the object.

3. The method of claim 1, wherein at least one of the illumination mediums is one of a point light illumination medium and an extended light source with substantially uniform diffuse illumination.

4. An information capturing system, comprising:
first and second illumination mediums located externally to an information capturing module, wherein the illumination mediums are coupled to the information capturing module, and wherein the illumination mediums are activated in response to a control signal transmitted by the information capturing module;
the information capturing module comprising,
a processing unit;
a scan module;
a memory storing at least one process that is operative on the information capturing system, the process comprising:
illuminating an object using illumination from the first illumination medium;
capturing a first electronic representation of the object;
illuminating the object using illumination from the second illumination medium, wherein an illumination from the first illumination medium is at substantially the same wavelength as an illumination from the second illumination medium;
capturing a second electronic representation of the object; and
analyzing the first and second captured electronic representations of the object.

5. The information capturing system of claim 4, wherein at least one of the illumination mediums is activated more frequently than the scan module of the information capturing system.

6. The information capturing system of claim 4, wherein the illumination mediums are directed asymmetrically at the object.

7. The information capturing system of claim 6, wherein at least one of the illumination mediums is positioned manually in order to be directed asymmetrically at the object.

8. The information capturing system of claim 6, wherein at least one of the illumination mediums is positioned automatically in order to be directed asymmetrically at the object.

9. The information capturing system of claim 4, wherein at least one of the illumination mediums is one of a point light illumination medium and an extended light source with substantially uniform diffuse illumination.

10. The information capturing system of claim 4, wherein at least one of the illumination mediums includes one of a continuous mode fluorescent light-box and a flash illumination light box.

11. The information capturing system of claim 10, wherein the flash illumination light box includes one of a plurality of LEDs and a plurality of flash lamps.

12. The information capturing system of claim 4, wherein: the information capturing module transmits a control signal for actuating at least one illumination medium, a duration of an exposure setting of the information capturing module is longer than a duration of the control signal.

13. A method, comprising:
coupling first and second external illumination sources to an information capturing module, wherein the first and second illumination sources are activated in response to a control signal transmitted by the information capturing module;
positioning the first external illumination source at a first angle relative to an object;
positioning the second external illumination source at a second angle relative to the object, the second angle being different than the first angle;
positioning the information capturing module at a third angle relative to the object, the third angle being different than the first and second angles;
directing a first light from the first external illumination source at the object;
while the first light is illuminating the object, capturing a first image of the object by the information capturing module;
directing a second light from the second external illumination source at the object;
while the second light is illuminating the object, capturing a second image of the object by the information capturing module, the first light and the second light being at substantially the same wavelength; and
analyzing the first and second captured images.

14. The method of claim 13, wherein the images of the object are captured as the object is in motion within a field of view of the information capturing module.

15. The method of claim 14, wherein the object is in motion on an assembly line.

16. A system, comprising:
first means for directing a first light to an object;
second means for directing a second light to the object, the first light and the second light being at substantially the same wavelength;
means for capturing, while the first light is illuminating the object, a first image of the object, the first means for directing the first light being located externally to, but coupled with, the means for capturing the first image;
means for capturing, while the second light is illuminating the object, a second image of the object, the second means for directing the second light being located externally to, but coupled with, the means for capturing the second image;
means for analyzing the first and second captured images.

17. The system of claim 16, wherein the images of the object are captured as the object is in motion within a field of view of the means for capturing.

18. The system of claim 17, wherein the object is in motion on an assembly line.

* * * * *